United States Patent [19]
Griffin

[11] 3,889,260
[45] June 10, 1975

[54] ANALOG ECHO PROTECTION CIRCUIT FOR DME

[75] Inventor: Earl Harris Griffin, Los Angeles, Calif.

[73] Assignee: RCA Corporation, New York, N.Y.

[22] Filed: Jan. 2, 1974

[21] Appl. No.: 430,212

[52] U.S. Cl. .................................................. 343/7.3
[51] Int. Cl. .............................................. G01s 9/56
[58] Field of Search ..................... 343/6.5 LC, 7.3

[56] References Cited
UNITED STATES PATENTS

| | | | |
|---|---|---|---|
| 3,478,355 | 11/1969 | Lundgreen et al. | 343/7.3 |
| 3,641,572 | 2/1972 | Lundgreen et al. | 343/7.3 |
| 3,702,475 | 11/1972 | Alden et al. | 343/7.3 |

*Primary Examiner*—T. H. Tubbesing
*Attorney, Agent, or Firm*—Edward J. Norton; Raymond E. Smiley

[57] ABSTRACT

An "echo" pulse sensing and correction circuit for aircraft radio distance measuring systems, such as DME. When a DME system is locked onto echo pulses, it receives desired reply pulses from the station, which are in synchronism with, but earlier in time than, the echo pulses and may also receive random reply pulses. A timer in the echo detection circuit monitors the time between the sending by the DME system of an interrogation pulse and the receipt of a reply pulse. A check is made at substantially the same time following the sending of each of a plurality of subsequent interrogation pulses to determine if a synchronous reply pulse occurs at the same time. If so, the reply pulses are assumed to be the DME reply pulses. If no further reply pulses are returned at the same time, following the sending of two interrogation pulses next following the first ones, the first pulse is assumed to be a random pulse and the timer continues to time until another reply pulse is received whereupon the echo detection circuit repeats the steps previously outlined.

5 Claims, 4 Drawing Figures

ANALOG ECHO PROTECTION CIRCUIT FOR DME

BACKGROUND OF THE INVENTION

In aircraft distance measuring systems, generally known in commercial aviation as DME, the slant range from any aircraft to a selected ground based station, known as a TACAN station, is determined by measuring the time delay between the moment of transmission of an interrogation pulse by the airborne DME and the receiving of a reply pulse transmitted by the ground station.

A potentially dangerous condition may occur if the DME fails to lock onto the correct reply pulses, but locks onto echo pulses. Such echo pulses occur as a result of the interrogation pulses from the aircraft or the reply pulses from the ground station striking and reflecting from an object intermediate the aircraft and ground station. Under either condition, the time delay between transmission by and receipt of a signal at the aircraft is lengthened over the time required for a straight line transmission. Therefore, the distance displayed by the DME (which is computed by multiplying the measured time for signal travel to and from the ground station by half the known velocity of light) is erroneously long.

In the prior art, it is known to discriminate between valid replies and echo replies on the basis that the distance manifested by valid replies is shorter than, and in synchronism with, any echo replies. This discrimination is achieved by providing a special echo range gate beginning at the time the earliest valid reply signal may be received after an interrogation pulse is sent by the DME for testing whether a set of tracked replies, manifesting a certain distance, is a valid set or an echo set. If no reply pulse is received during the time the echo range gate is present, it is moved out in time by the width of an echo range gate pulse, or somewhat less, as each new interrogation pulse is sent. When the echo range gate has moved out to the distance manifested by the tracked set of replies, the range gate is reset back to zero. If, however, a reply pulse is passed through the echo range gate, it is held stationary while several more interrogation pulses are sent, for the purpose of discriminating against DME squitter pulses, as known in the art. If reply pulses are received a sufficient number of times while the range gate is stationary, the pulses are assumed to be the valid DME reply pulses, and the tracked set of pulses are assumed to be echo pulses. In such a case, appropriate action is taken to cause the tracking DME to unlock from the echo reply pulses and lock onto the valid DME reply pulses.

Such an echo-discriminating search method is very time consuming. For example, assuming an interrogation pulse repetition rate of 10 hz, a 15 $\mu$ sec range gate, a 50% overlap of the range gate and a search over a 100 mile range, a search will take approximately 16 seconds in addition to the time taken to check out random squitter reply pulses to determine if they are, in fact, the DME reply pulses. During the 16 seconds the DME will be displaying an erroneously longer distance than the correct distance from the ground station.

SUMMARY OF THE INVENTION

Distance measuring equipment (DME) as is known, transmits a series of interrogation pulses toward a remote beacon and receives pulses from the beacon including reply pulses synchronized with the interrogation pulses. This invention utilizes apparatus in conjunction with the DME to determine the position of a set of synchronized reply pulses.

The apparatus includes logic circuitry including a first timer initially set to a time $t_1$ ($t_1$ has a given value corresponding to a certain range within the above mentioned given range interval), which is responsive to a single interrogation pulse for determining and storing a time $t_2$ corresponding to the range of the first received reply pulse occuring after time $t_1$.

Also included is additional logic circuitry including a second timer responsive to at least one interrogation pulse subsequent to the first interrogation pulse for determining whether reply pulses continue to occur substantially at time $t_2$.

Additional logic is responsive to the failure of reply pulses to continue to occur for causing the first mentioned logic circuitry to be responsible solely to the next following interrogation pulse for determining and storing a measure of time $t_3$ corresponding to the range of the first received reply pulse, which occurs after time $t_2$ and is also responsive to the continuation of occurrance of reply pulses for deriving an output signal indicating that the reply pulses that continue to occur are reply pulses synchronized with said interrogation pulses.

BRIEF DESCRIPTION OF THE DRAWING

FIG. 1b is a timing diagram useful in explaining the apparatus of FIG. 1a;

DETAILED DESCRIPTION

Figure 1A:
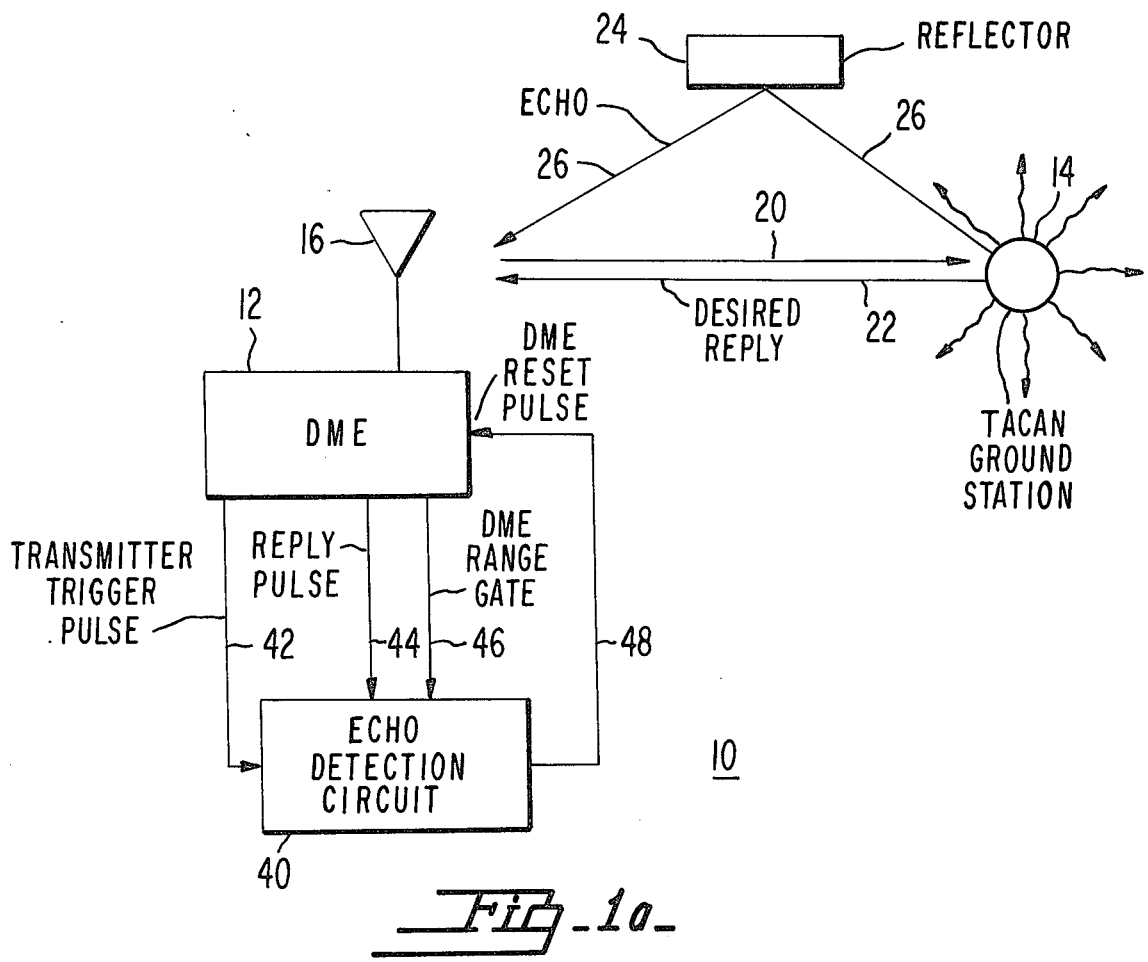
FIG. 1a is a block diagram illustrating the connections between a DME and an echo discrimination circuit useful therewith.
Figure 1B:
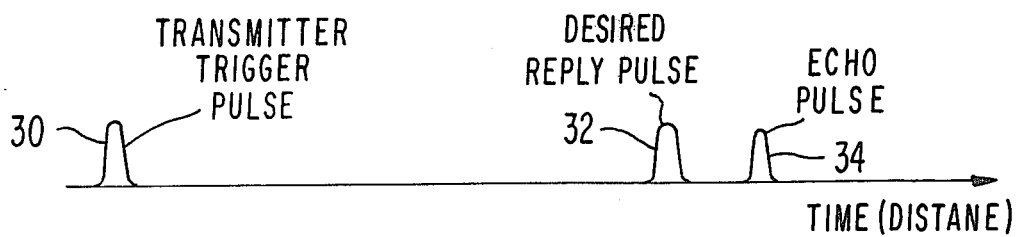

In FIG. 1a, an aircraft distance measuring system 10 is seen to comprise an aircraft mounted distance measuring equipment (DME) 12, and a TACAN ground station 14 illustrated schematically as a circle. The DME 12 may be any of a number of commercially available DME's such as RCA model AVQ-75, a complete description of which is included in instruction manual 1B96435-1. An antenna 16, located on the outside of the aircraft (not shown) is coupled to the DME 12, permitting pulses to be transmitted from the aircraft to the TACAN station as indicated by line 20 and permitting the DME to receive signals transmitted by the TACAN station along line 22. Unfortunately, pulses transmitted to or from DME 12 occasionally strike a reflecting structure 24, such as a mountain, a building, or perhaps another aircraft, and they take the path indicated by lines 26. Such pulses which strike an intermediate object are termed echo pulses. FIG. 1b illustrates the timing relationship between an interrogation pulse termed a transmitter trigger pulse 30 transmitted by the DME 12, and the desired or valid DME reply pulses 32 and echo reply pulses 34. Since the echo pulses travel further, they will always occur later in time than the desired reply pulses and for a given reflector 24, always be at a fixed time later.

Returning to FIG. 1a, DME 12 is electronically interconnected with an echo detection circuit (EDC) 40 to be described in detail shortly. The purpose of EDC 40 to detect whether DME 12 is locked, not to the desired reply pulses transmitted directly from a TACAN station 14, but rather to echo pulses reflected from a reflector 24.

Three lines transmit pulses from DME 12 to EDC 40. Transmitter trigger pulses transmitted on line 42 correspond in time to the pulses which are transmitted via antenna 16 to TACAN 14. (The pulse on line 42 is a single pulse between 28 and 34 microseconds in width, whereas antenna 16 transmits two 3.5 microsecond radio frequency pulses.) The repetition rate depends upon whether DME 12 is searching for signals returned from the TACAN station 14 (termed "search mode") or whether the DME has acquired or locked onto pulses which it assumes to be the desired reply pulses (termed "track mode"). Only the latter mode is of importance in this discussion. During search and for the first 15 seconds after the DME has gone into track mode, the repetition frequency of the transmitter trigger pulses is 40 hz; thereafter, it is 10 hz.

The second output from DME 12 is over line 44, which transmits the decoded video pulses which correspond to return pulses from the TACAN station 14, termed reply pulses. Ideally, the reply pulses comprise the desired reply pulses which are synchronous (over the time frame of interest) with the trigger pulses and pulses which are meant for other airplanes which may also be interrogating TACAN 14, and which are random in time relative to the trigger pulses (termed squitter pulses). If, however, the echo pulses are present because of a reflector 24, they also appear as reply pulses. Reply pulses are approximately 3.5 microseconds in width.

The third pulse transmitted to the echo detection circuit 40 over line 46 is the DME range gate. This pulse of fixed duration of approximately 10-15 microseconds is positioned in time relative to the transmitter trigger pulse to bracket the expected arrival time of the desired reply pulses from the TACAN station 14. If, however, echo signals are present, the DME range gate may become erroneously positioned in time to bracket the echo pulses with the result the DME displays an erroneously long distance between the TACAN station and aircraft containing DME 12.

If the echo detection circuit determines, in a manner to be described, that it is locked onto an echo pulse, the echo detection circuit will produce on line 48, a pulse to cause DME 12 to initiate a new search signal for the desired reply pulses from TACAN station 14.

Figure 2:
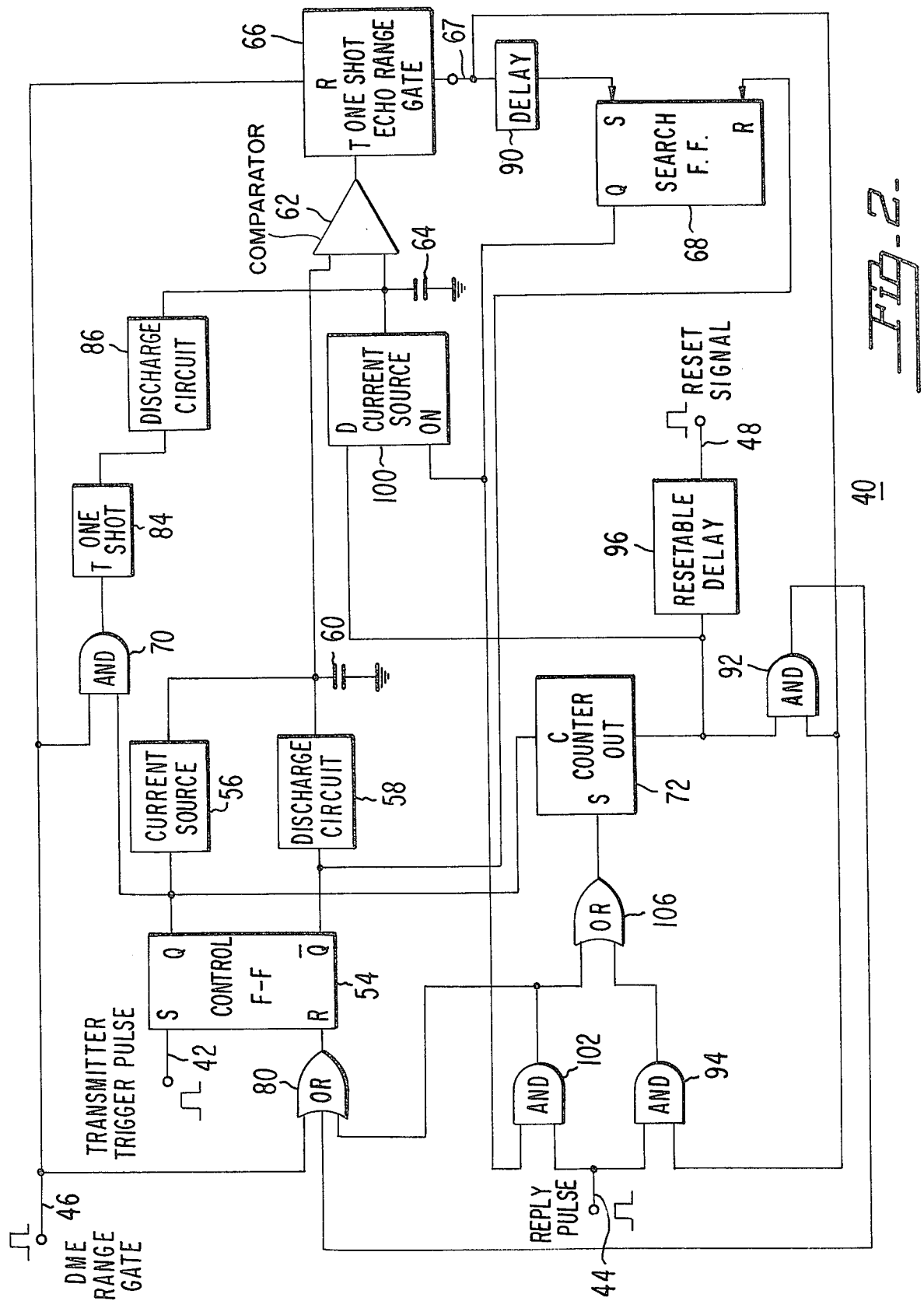
FIG. 2 is a logic diagram of a preferred embodiment of the invention.

In FIG. 2, which illustrates logic in schematic form for an echo detection circuit 40, transmitter trigger pulses are applied over line 42 to the set (S) input terminal of a control flip-flop 54. The Q terminal of flip-flop 54 is coupled to the input terminal of a current source 56, while the $\overline{Q}$ terminal is coupled to the input terminal of a discharge circuit 58. The output terminals of current source 56 and of discharge circuit 58 are coupled to a timing means such as a capacitor 60 to charge and discharge the same, respectively. Thus, with flip-flop 54 reset, discharge circuit 58 discharges capacitor 60 to a slightly negative potential relative to a reference voltage such as ground. With flip-flop 54 set, discharge circuit 58 is disabled, and current source 56 begins to charge the capacitor, the voltage on the capacitor being directly proportional to the time since the last transmitter trigger pulse was applied at terminal 52.

Capacitor 60 is coupled to one input terminal of comparator 62. Another timing means, such as capacitor 64, is coupled to the other input terminal of comparator 62. The output terminal of comparator 62 is coupled to the trigger (T) terminal of a one-shot echo range gate (ERG) 66. In response to an equality of the two input signals to comparator 62, it produces a logic 1, which triggers ERG 66 to produce a logic 1 at terminal 67 for a given time, such as 15 microseconds.

Returning to control flip-flop 54, the $\overline{Q}$ terminal is coupled to the reset (R) terminal of search flip-flop 68. The Q terminal of flip-flop 54 is coupled to one input terminal of an AND gate 70, and to the count (C) terminal of a count-down counter 72, which is responsive to the leading edge of a logic 1 at the C terminal for decrementing by a count of 1.

The DME range gate signal from DME 12 (FIG. 1) is applied over line 46 to the other input terminal of AND gate 70 to one input terminal of OR gate 80, and to the reset (R) terminal of ERG 66. Normally, ERG 66 produces a logic 1 for 15 microseconds at terminal 67 after being triggered by a logic 1 at the T input and then resets to logic 0. However, a logic 1 applied to the R terminal causes echo range gate 66 to reset immediately. The output terminal of AND gate 70 is coupled to the T input of a one-shot 84, the output of which is coupled to control a discharge circuit 86. When a logic 1 is applied to the T terminal of 1-shot 84, it activates the discharge circuit for a sufficient time period to fully discharge capacitor 64.

Terminal 67 of echo range gate 66 is coupled to the input terminal of a delay 90 and to an input terminal of each of AND gates 92 and 94. The output terminal of AND gate 92 is coupled to a second input of OR gate 80.

AND gate 92 receives at its other input terminal signals from the output (OUT) terminal of counter 72. Counter 72 is also coupled to a resettable delay means 96. Counter 72 produces a logic 1 at its output terminal when it is at a count of other than 0. The resettable delay 96 is of a type that begins to reset when a logic 1 is applied at its input terminal. If a logic 1 is applied for a sufficiently long time to delay 96, a signal is produced over line 48 to reset DME 12 (FIG. 1) to begin a new search cycle.

The output terminal of counter 72 is also coupled to the disable (D) terminal of a current source 100.

Returning to delay 90, its output terminal is coupled to the S terminal of search flip-flop 68. The Q output terminal of the flip-flop is coupled to the ON input terminal of current source 100, and to one input terminal of AND gate 102. When a logic 1 is applied to the ON terminal and a logic 0 is applied to the D terminal of current source 100 it will charge capacitor 64 at a rate which is directly proportional to the time since the charging began. Under all other input conditions, the current source does not produce current to charge the capacitor. The capacitor, therefore, stores the charge (time) until discharged by discharge circuit 86.

Reply pulses from DME 12 are applied over line 44 to one input terminal of each of AND gates 94 and 102. The output terminal of each AND gate is coupled to OR gate 106, the output terminal of which is coupled to the set (S) terminal of counter 72. A logic 1 at OR gate 106 causes the counter to be jammed to a count of 2. The output terminal of AND gate 102 is also coupled to the third input terminal of input 80 the output terminal of which is coupled to the R terminal of control flip-flop 54.

Before describing the operation of the circuit of FIG. 2, a few conventions will be established. An AND gate produces a logic 1 only when all input terminals are at a logic 1. An OR gate produces a logic 1 when any input terminal is at a logic 1. A flip-flop is set and reset by the leading edge of a logic 1 signal applied at the S and R terminals, respectively. Simultaneously, inputs at the R and S terminals causes a flip-flop to be reset. When a flip-flop is set, a logic 1 appears at the Q terminal while a logic 0 appears at the $\overline{Q}$ terminal. The reverse output conditions are true when the flip-flop is reset. All input lines from DME 12 are normally at a logic 0 and change momentarily to a logic 1 to indicate the presence of a pulse. Signals are presumed to emit from the right side or bottom side of all logic elements and to enter the left side or top side of all logic elements unless a contrary condition is indicated by an arrow.

In the description of the operation of the DME system that follows, it will be assumed (except as otherwise stated) that DME 12 is in the track mode and that the DME range gate is bracketing echo reply pulses rather than desired or valid reply pulses transmitted directly from TACAN 14 to antenna 16. Further, it is assumed that flip-flops 54 and 68 are reset, that capacitor 64 is discharged to 0 volts, and that capacitor 60 is discharged to a slightly negative potential.

Figure 3:
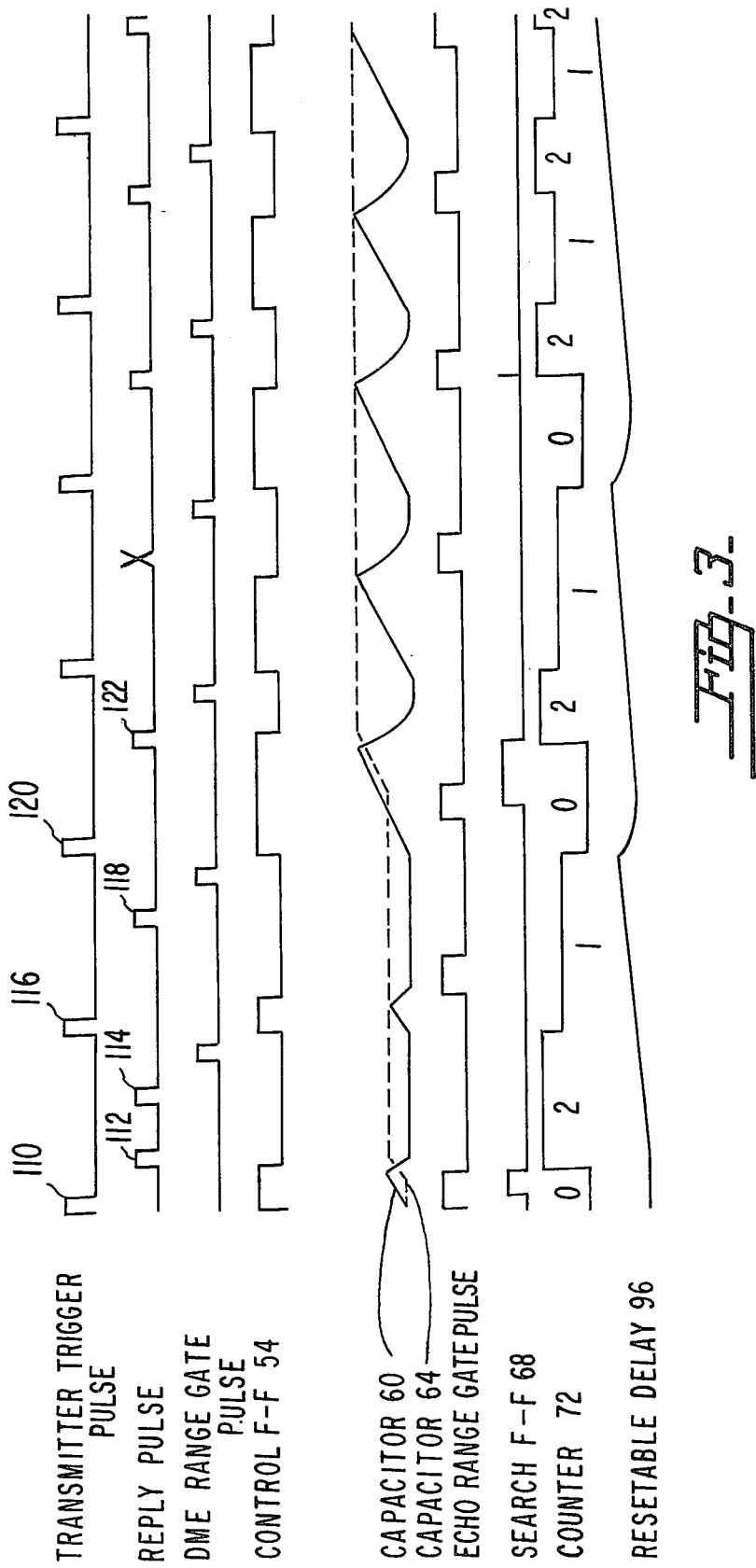
FIG. 3 is a set of waveforms useful in understanding the FIG. 2 logic diagram.

Reference should be made as needed to the waveforms of FIG. 3 to understand the operation of EDC 40, FIG. 2. In FIG. 3, several cycles of the operation of the DME system are shown, each cycle running from the leading edge of one transmitter trigger pulse to the leading edge of the next. In FIG. 3, the horizontal axes represent time which is directly proportional to the distance between DME 12 and TACAN 14. The figure is not, however, drawn to an accurate time scale for practical drafting reasons. For example, the width of all three input pulses to echo detection circuit 40 are illustrated as being equal, whereas they vary considerably in width. Also, the spacing between adjacent transmitter trigger pulses should be much greater than illustrated. However, the principals are accurately illustrated in FIG. 3.

In operation, the DME 12 transmits a transmitter trigger pulse (labeled 110 FIG. 3) via antenna 16 to TACAN 14 and over line 42 to control flip-flop 54. The leading edge of the transmitter trigger pulse sets the flip-flop. The resulting logic 1 output from terminal Q primes AND gate 70, and enables current source 56 to initiate the charge of capacitor 60. Capacitor 60 has been previously discharged to a very slightly negative potential which may, for purposes of this discussion, be ignored. Since the voltage of capacitor 60, at any time, is directly proportional to time, the voltage on capacitor 60 represents time since the transmitter trigger pulse was transmitted. When the voltage on capacitor 60 reaches the same voltage as the voltage on capacitor 64 (a matter of a few microseconds), comparator 62 will be enabled producing a logic 1 to trigger echo range gate 66. Range gate 66 thereupon produces a logic 1 at terminal 67 for a given time such as 15 microseconds. The logic 1 primes AND gates 92 and 94. However, as counter 72 is at a count of 0, and therefore, producing a logic 0 at its OUT terminal, AND gate 92 will not be enabled. Since the first reply pulse, pulse 112, as illustrated in FIG. 3, occurs after echo range 66 is reset, AND gate 94 will not be enabled. (It should be noted that the relative times of occurrence of reply pulses with respect to the times of occurrence of transmitter trigger pulses is arbitrarily chosen for purposes of illustrating circuit operation.) After a delay equal to half the width of the range gate pulse at terminal 67, a logic 1 output from delay 90 sets search flip-flop 68. The resulting logic 1 at the Q terminal primes AND gate 102 and enables current source 100 which begins charging capacitor 64 at the same rate at which capacitor 60 is charging.

If it is assumed for the moment that the DME range gate is locked onto desired reply pulses from TACAN 14 (i.e. that the DME range gate is positioned in time to bracket the desired reply pulses returning from TACAN 14 in response to transmitter trigger pulses being sent to the TACAN station) and that no squitter reply pulses are received by DME 12, then the DME range gate pulse appearing in due course over line 46 will, via OR gate 80, reset control flip-flop 54 and will enable AND gate 70 to trigger one-shot 84. The resulting logic 1 from one-shot 84 enables discharge circuit 86 to discharge capacitor 64. With control flip-flop 54 reset, the resulting logic 1 signal at the $\overline{Q}$ terminal enables discharge circuit 58 to discharge capacitor 60. Then, upon receipt of the next transmitter trigger pulse over line 42, the operation just described will repeat again.

As illustrated in FIG. 3, however, a pulse designated as reply pulse 112, is received from TACAN station 14, producing a logic 1 at terminal 44. This pulse may be a squitter pulse (i.e. one that does not appear at the same time following several successive transmitter trigger pulses) or it may be a desired or valid reply pulse (i.e. the reply pulse meant for our aircraft which ideally follows each transmitter trigger pulse by a substantially fixed time varying only as the aircraft and thus, DME 12, moves closer to or further from TACAN 14). Echo detection circuit 40 will determine which type of pulse pulse 112 is.

Reply pulse 112 enables AND gate 102, thus resetting flip-flop 54 via OR gate 80, and jams counter 72 via OR gate 106 to some fixed count, N, such as 2. The number N is chosen as a result of experimentation. Experimentation with a prototype of the apparatus described herein has revealed that N should be either 2 or 3. The logic 1 from the $\overline{Q}$ terminal of flip-flop 54 enables discharge circuit 58 to discharge capacitor 60 and resets search flip-flip 68. The logic 1 from the output terminal of counter 72 (present since the counter is at a count of other than 0), applies a disable signal to current source 100 which, at this time, has no effect since the current source has already been disabled by reset search flip-flop 68. The result is that capacitor 64 is storing a voltage directly proportional to the time between receipt of a transmitter trigger pulse and receipt of a reply pulse by EDC 40 less a time equal to one half the pulse width of the echo range gate.

Thereafter, a second reply pulse labeled 114 will appear over line 44. Since neither AND gate 94 nor 102 are primed, pulse 114 has no effect.

When the next transmitter trigger pulse (pulse 116, FIG. 3), is transmitted by DME 12 to TACAN 14, it again sets flip-flop 54, causing counter 72 to be decremented by 1 to a count of 1, and causing capacitor 60 to begin charging. It charges until it reaches the voltage at which capacitor 64 is setting, at which time comparator 62 is enabled, and a pulse is produced by echo range gate 66. It should be remembered that capacitor 64 is storing a voltage proportional to the time at which pulse 112 occurred in the previous cycle less one half the echo range gate pulse width. Thus, if pulse 112 is a desired pulse, a similar pulse should appear at the center of the echo range gate, ignoring any slight shift due to aircraft movement relative to the TACAN station between successive transmitter trigger pulses.

As a result of the echo range gate pulse at terminal 67, AND gate 92, primed by counter 72, is enabled resetting flip-flop 54 via OR gate 80. The resulting logic 1 from the $\overline{Q}$ terminal of flip-flop 54 causes discharge circuit 58 to discharge capacitor 60. It also causes search flip-flop 68 to reset and remain reset even though, when half a gate delay after the beginning of range gate 66, a logic 1 from delay 90 will be applied to the S terminal of flip-flop 68. Current source 100 remains disabled both because flip-flop 68 does not become set and because counter 72 is not at a count of O. Therefore, capacitor 64 maintains its charge.

It can be seen from FIG. 3 that no reply pulse appears during the time that range gate 66 is present in the cycle following transmitter trigger pulse 116. Therefore, neither AND gate 94 nor 102 is enabled. When the later appearing reply pulse 118 is present, neither AND gate 94 nor 102 is primed. It thus begins to appear that reply pulse 112 was a random pulse. When the next transmitter trigger pulse appears (pulse 120, FIG. 3), counter 72 will be decremented to a count of 0. AND gate 92 is not enabled and control flip-flop 54 is not reset. Rather, after the delay occasioned by delay 90, search flip-flop 68 is set enabling current source 100 to continue charging capacitor 64, which again therefore exhibits a voltage proportional to the time since the latest transmitter trigger pulse, i.e., pulse 120, less the delay caused by delay 90.

Should a reply pulse occur while the echo range gate pulse is present, it will, via one or both AND gates 94 and 102, jam counter 72 to a count of 2. If the reply pulse occurs before the setting of search flip-flop 68, enabled AND gate 92 will reset flip-flop 54. If the reply pulse occurs after search flip-flop 68 is set, it will reset flip-flop 54 via AND gate 102. In either event, current source 100 is disabled so that charging of capacitor 64 is stopped. However, from FIG. 3 it can be seen that again no reply pulse occurs while the echo range gate is present in the cycle beginning with transmitter trigger pulse 120. Therefore, it is assumed that reply pulse 112 was a random reply pulse since in two succeeding cycles a reply pulse did not appear at the time at which pulse 112 appeared. When reply pulse 122 appears, it will, via primed AND gate 102, set counter 72 disabling current source 100 and resetting flip-flop 54, which in turn causes flip-flop 68 to reset in a manner similar to that previously described. EDC 40 will thereafter determine that reply pulses appear for several consecutive cycles at the same time as reply pulse 122. Even if a reply pulse is only present for some fixed number, Y, of consecutive cycles (Y = 1 in the logic of FIG. 3), out of N cycles, as may happen under certain atmospheric conditions, capacitor 64 will maintain the same charge indicating the time when a reply pulse should appear in consecutive cycles. In FIG. 3, for example, an X in the reply pulse waveform indicates where a reply pulse should have been received.

It is important to note that when EDC 40 determined that the reply pulse at the position of reply pulse 112 was a random pulse, it immediately began to investigate pulses at the position of pulse 122. That is, the echo range gate did not move one range gate width or somewhat less each cycle until it located the pulse at the position of pulse 122. Rather, immediately after pulse 112 was determined to be a random or squitter (i.e. in the Nth cycle (N = 2) following the one in which reply pulse 112 appeared) timing means 64 immediately timed to pulse 122 and in the N + 1 cycle the range gate centered on pulse 122. When pulse 122 is detected, counter 72 is set as previously mentioned. Whenever counter 72 is at a count of other than 0, the resulting logic 1 at the OUT terminal enables resettable delay 96. As indicated by the lower two waveforms in FIG. 3, when the counter is at other than 0, a delay commences in delay 96. When counter 72 is thereafter at 0, the delay begins to reset, but this process takes more than one cycle. If the delay remains enabled long enough, as will be the case if pulses appear at the time pulse 122 appeared for a sufficient number of cycles, a reset pulse will appear on line 48. If, for example, a pulse appears each cycle at the same position a reset pulse will appear after approximately 10 cycles. If some pulses are missing, the time to generate a reset pulse is appropriately increased. The reset pulse causes DME 12 to go into a search mode to again look for desired reply pulses.

If DME 12 is found to be locked onto the desired reply pulses only random pulses will appear on line 44, FIG. 2. EDC 40 will check each one out in the manner above described. It may happen that a reply pulse is located sufficiently close to the time of the desired pulses that the echo range gate is still present when the DME range gate is generated. In that case, DME range gate pulse at the R terminal of echo range gate one-shot 66 resets the one-shot.

What is claimed is:
1. In a distance measuring system of the type which transmits a series of interrogation pulses toward a remote beacon and receives a stream of pulses from said beacon including reply pulses synchronized with said interrogation pulses; the improvement comprises the combination therewith of apparatus for determining, within a given range interval, the position of a set of synchronized reply pulses; said apparatus comprising:
 a. first means including a first timer initially set to a time $t_1$, where $t_1$ has a given value corresponding to a certain range within said given range interval, for determining and storing, in response to solely a first single interrogation pulse, a measure of the time $t_2$ corresponding to the range of the first received reply pulse which occurs after time $t_1$;
 b. second means including a second timer for determining in response to at least one interrogation pulse subsequent to said first interrogation pulse whether reply pulses continue to occur substantially at time $t_2$; and
 c. third means coupled to said first and second means and responsive to the failure of said reply pulses to continue to occur for causing said first means to determine and store in response to solely the next following single interrogation pulse a measure of the time $t_3$ corresponding to the range of the first received reply pulse which occurs after time $t_2$, said third means being responsive only to the continua- tion of occurrence of said reply pulses for deriving an output signal indicating that said reply pulses which continue to occur are reply pulses synchronized with said interrogation pulses.

2. The combination as set forth in claim 1, wherein said distance measuring system is tracking a set of reply pulses and where said set of synchronized reply pulses, if present, are valid reply pulses, and where there is further included a means responsive to said output signal to cause said distance measuring system to stop tracking the set of reply pulses it is tracking and to search for said valid reply pulses.

3. Apparatus for distinguishing synchronized reply pulses from random reply pulses, comprising in combination:
- means producing a series of spaced apart reference pulses each marking the start of a cycle;
- means producing a series of reply pulses, some of which are synchronized in time relative to said reference pulses and some of which are random relative thereto;
- timing means storing a signal indicative of time, $t$, between receipt of one reference pulse and a reply pulse in the same cycle;
- means producing a range gate pulse at time, $t$, in the N successive cycles next following the one in which said one reference pulse occurred, where N is a fixed integer greater than zero;
- means responsive to the absence of any reply pulses during the presence of said N range gate pulses, being indicative that said reply pulse being timed was a random reply pulse, for causing said timing means to time until another reply pulse is received during the Nth cycle following the one in which said one reference pulse occurred and then to store that new time, $t'$, which represents the time of occurrence of said another reply pulse in its cycle;
- said means for producing range gate pulses producing N additional range gate pulses at time, $t'$, during the N cycles following the one in which said another pulse was produced; and
- means responsive to the presence of a reply pulse during at least Y of said times said N additional range gate pulses are present for indicating said another reply pulse is a synchronized reply pulse, where Y is a preselected integer not greater than N.

4. The combination as set forth in claim 3, wherein means for causing said timing means to time comprises a counter, means responsive to said a reply pulse for energizing said counter, means responsive to each of the following reference pulses for altering the count in said counter by a unit value, and means responsive to the counter having been altered by a count of N times said unit value and by the concurrent presence of the next following said range gate pulse for causing said timing means to time until another reply pulse is received.

5. The combination as set forth in claim 3, wherein said means producing a range gate pulse comprises a second timing means producing a signal indicative of the time following each reference pulse and a comparison means for comparing the signal from said timing means indicative of time, $t$, and the signal from said second time indicating means for producing a range gate pulse when said signals indicate equal time.

* * * * *